United States Patent [19]

Swartz

[11] 3,989,572
[45] Nov. 2, 1976

[54] METHOD OF MAKING IRRIGATION CONDUITS
[75] Inventor: Henry D. Swartz, Chestnut Hill, Mass.
[73] Assignee: Standard Oil Company (Indiana), Chicago, Ill.
[22] Filed: Dec. 15, 1975
[21] Appl. No.: 641,145

[52] U.S. Cl............................ 156/252; 156/271; 156/272; 156/290; 156/302; 61/12
[51] Int. Cl.² ................. B32B 31/00; B29C 19/02
[58] Field of Search .......... 156/252, 272, 290, 302, 156/303, 271; 61/12

[56] References Cited
UNITED STATES PATENTS
3,269,278   8/1966   Olstad........................... 156/271
3,594,261   7/1971   Broerman........................ 156/252
3,790,744   2/1974   Bowen........................... 156/272
3,830,067   8/1974   Osborn........................... 61/12

Primary Examiner—Douglas J. Drummond
Attorney, Agent, or Firm—Gregory E. Croft; Arthur G. Gilkes; William T. McClain

[57] ABSTRACT

A method for making irrigation conduits comprises the steps of perforating a first sheet of plastic film by repetitively forming rows of holes in the cross-machine direction, positioning a fabric strip over the holes, positioning a second sheet of plastic film under the first, sealing the fabric strips and the sheets of plastic film together by forming a plurality of fused seals running in the machine direction, and slitting the seals lengthwise to separate the resulting conduits.

5 Claims, 9 Drawing Figures

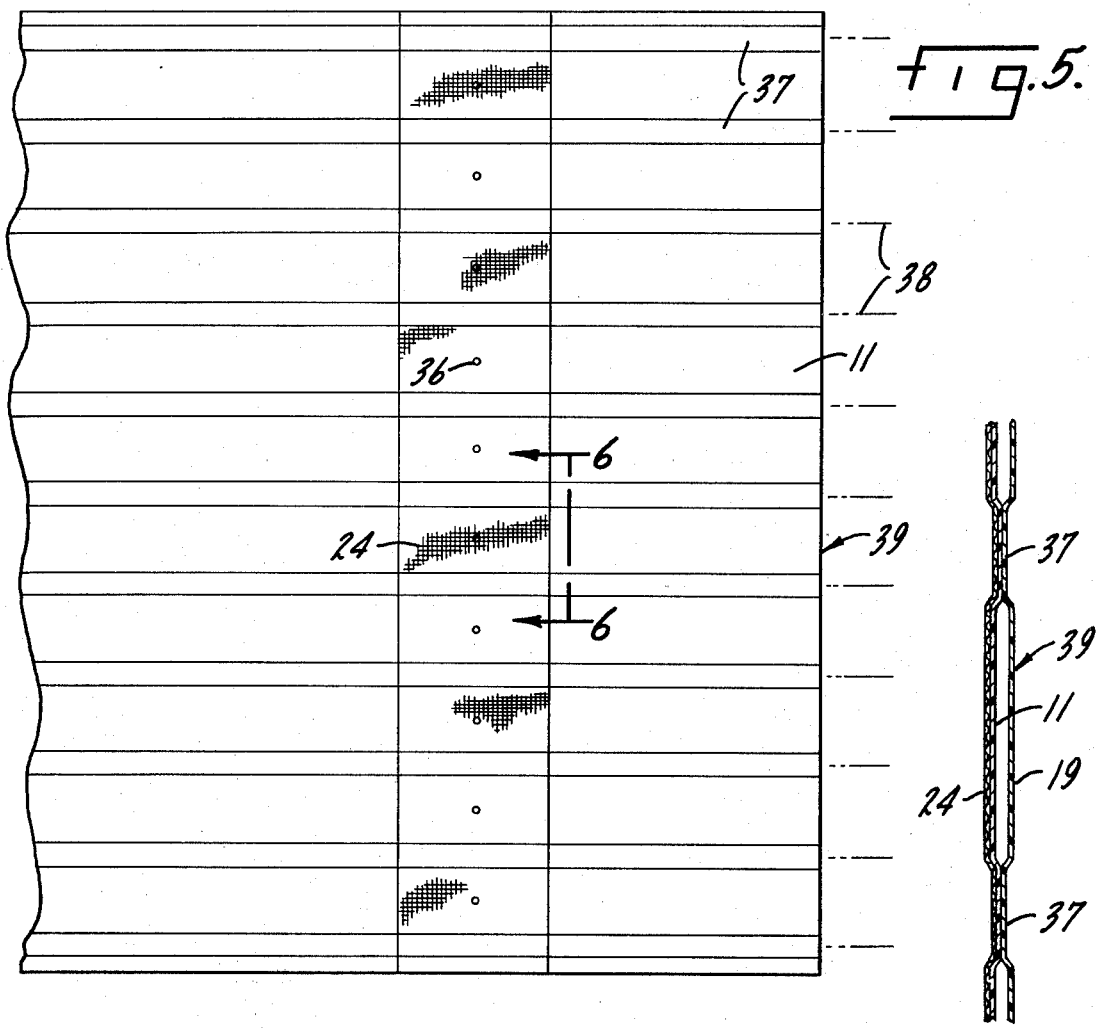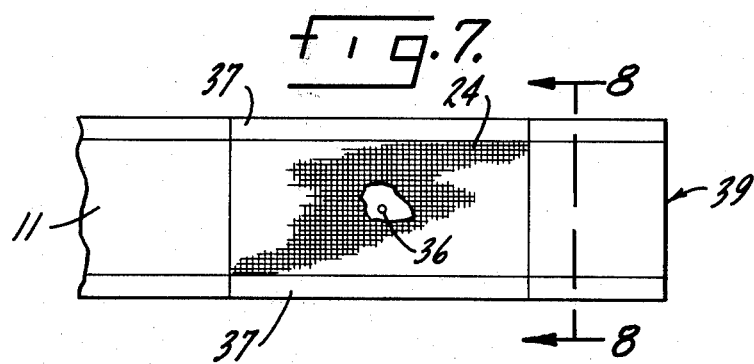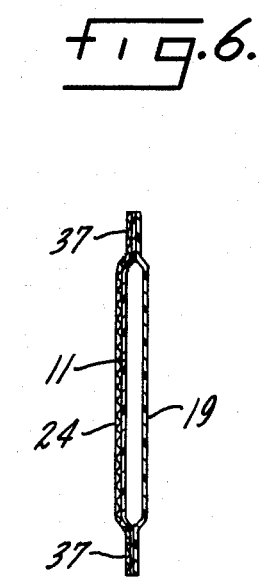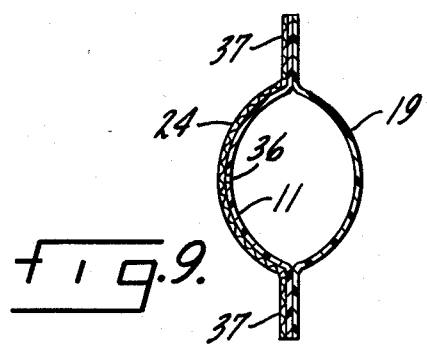

METHOD OF MAKING IRRIGATION CONDUITS

BACKGROUND OF THE INVENTION

1. Field of the Invention

This invention relates to a method of making irrigation conduits. More particularly, it relates to a method of making irrigation conduits having superposed first and second plastic strips and having holes spaced along its length with a fabric patch over said holes.

2. Description of the Prior Art

There is a large market for subsurface irrigation conduits in many areas because of the great need to conserve water. Subsurface irrigation conduits avoid evaporation losses and provide a means of delivering the water (which may be mixed with fertilizer and other chemicals) directly to the roots of the plants. This is of great importance in arrid areas where the normal rainfall is insufficient to sustain crops.

In order for these irrigation conduits to become practical, however, it is necessary to produce them in great quantity and at a low price. Of particular interest is a subsurface irrigation conduit having a woven fabric patch over the holes spaced along its length. While manufacturing irrigation conduits by heat sealing the edges of two plastic strips is known in the art, as mentioned in U.S. Pat. No. 3,830,067 (1974), no method of producing a conduit having a porous fabric bridge or patch which reduces the fluid pressure and distributes the fluid evenly to the soil has heretofore been known.

Accordingly, it is an object of this invention to provide an efficient method of making a subsurface irrigation conduit having a woven fabric patch covering the holes spaced along the length thereof.

This and other objects will become clear upon further reading of the specification.

SUMMARY OF THE INVENTION

Broadly, the invention resides in a method of making irrigation conduits comprising perforating a first sheet of plastic film with a perforating means and repetitively forming rows of holes in the cross-machine direction, positioning a fabric strip over the holes with a positioning means, positioning a second sheet of plastic film under the first sheet, sealing the fabric and the sheets of plastic film together with a sealing means forming a plurality of continuous seals spaced apart a predetermined distance and running in the machine direction, and separating the resultant individual conduits by slitting the seals.

BRIEF DESCRIPTION OF THE DRAWING

FIG. 5 is a plan view of the web before the individual conduits are separated by slitting the seals.

FIG. 6 is a segmented cross-section of the web taken along line 6—6 of FIG. 5.

FIG. 7 is a segmented plan view of a single conduit after the seals have been slit.

FIG. 8 is a cross-sectional view taken along line 8—8 of FIG. 7.

FIG. 9 is a cross-sectional view of the final conduit illustrating its shape when filled with fluid.

DESCRIPTION OF THE PREFERRED EMBODIMENT

Figure 1:
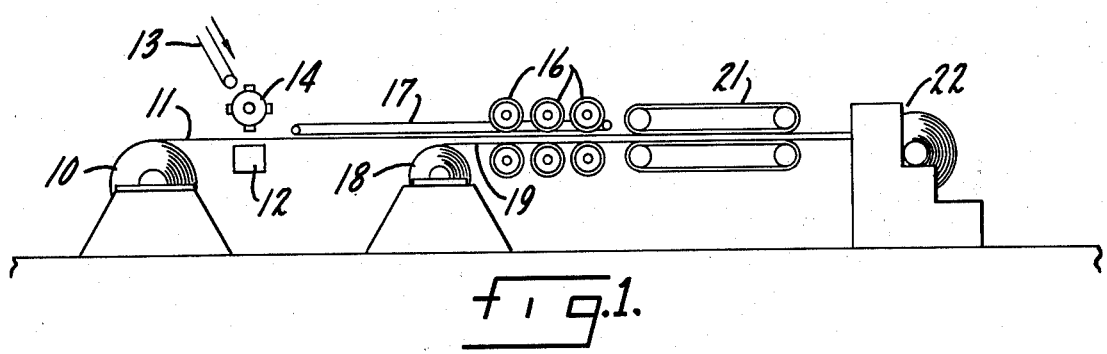
FIG. 1 illustrates a schematic view of the overall process.

In general, this invention resides in a process for producing irrigation conduits by perforating a first sheet of plastic film with a perforating means such as a laser and repetitively forming rows of holes in the cross-machine direction of the film. A fabric strip is placed over each row of holes by a positioning means, and a second sheet of plastic film is fed into the process underneath the first. The three components are then sealed together by a sealing means which forms a web having a plurality of continuous seals in the machine direction, spaced apart a predetermined distance. The unsealed portions of this web form the individual conduits, which may vary in number depending upon the width of the conduit and the width of the web. The individual conduits are then separated by slitting the seals. The resulting conduits can then be wound on a spool and cut to any desired length. Directing attention to the drawing, my invention will be described in more detail.

FIG. 1 illustrates the process of this invention in its preferred form and showing the major pieces of equipment. Shown is the supply roll 10 for the first sheet of plastic film 11 which is continuously passed over a laser 12 which repetitively forms rows of holes in the cross-machine direction. Simultaneously, or subsequently, a positioning means places fabric strips over each row of holes. The positioning means comprises a fabric strip conveyer 13 and a suction drum 14 which act in concert to properly position the fabric strips. The fabric strips are held in place en route to the sealing drums 16 by a multiple belt conveyor 17. Also shown is the supply roll 18 for the second sheet of plastic film 19, which is positioned underneath the first sheet before passing between the three pairs of sealing drums 16. The three drums are maintained at different temperatures to avoid any sealing problems associated with thermal shock. For example, if the welding point temperature lies between 400° and 600° F., the first pair of sealing drums could be maintained from 200°–400° F., the second pair from 400° to 600° F., and the third pair back down between 200° and 400° F. This gradual temperature profile is desirable for creating good seals. The resulting web is passed between a pair of cooling belts 21 and then fed to an inline slitter/winder 22 which separates the individual conduits and winds them up on rolls. The cooling belts can typically be maintained at temperatures between 0° and 50° F.

Figure 2:
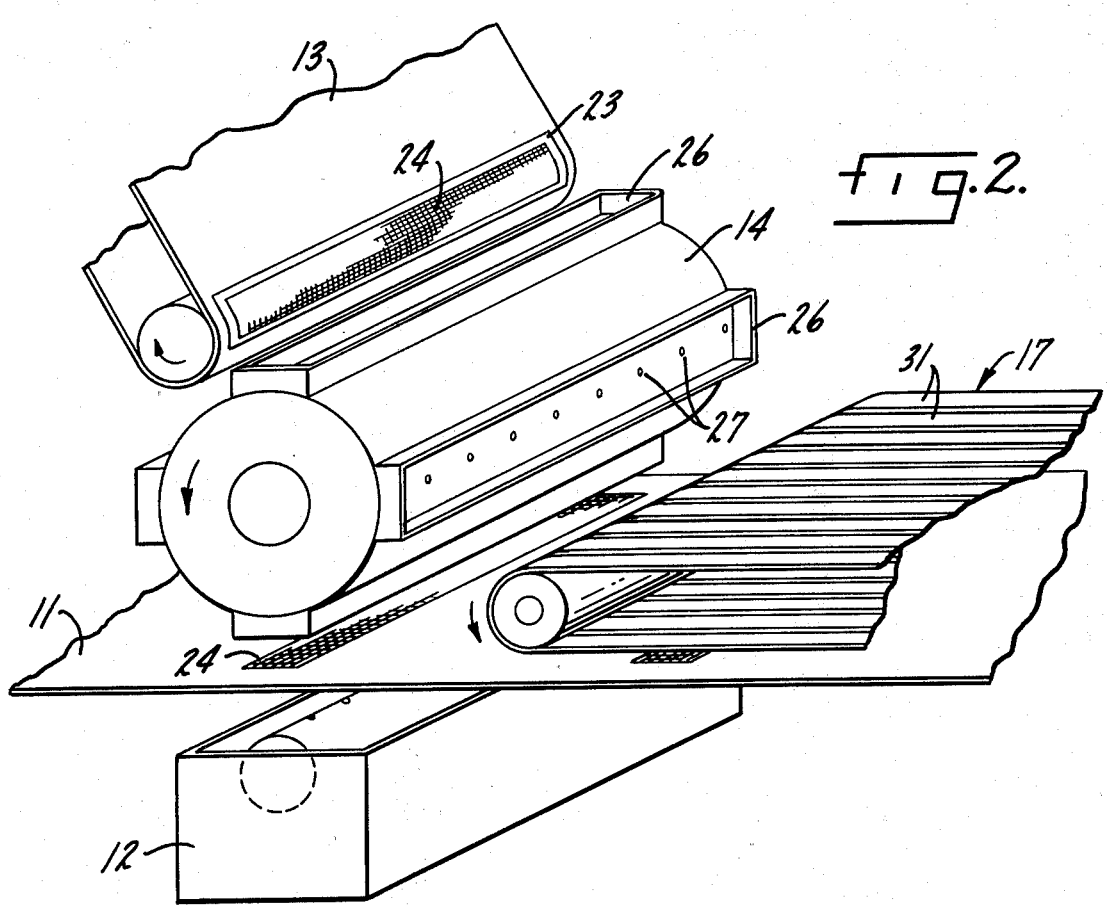
FIG. 2 is a perspective view of the laser section of the process illustrating the method of feeding the fabric strips and placing the strips over the holes formed by the laser.

FIG. 2 is a close-up perspective view of the laser station illustrating in more detail the operation of the positioning means. Shown is the fabric strip conveyor 13 which has trays 23 located every two feet. The spacing of the trays can vary, of course, depending upon the spacing of the rows of holes in the first sheet of plastic film. Each tray transports a woven polypropylene fabric strip 24 and deposits it into a corresponding tray 26 located on the rotating suction drum 14. The suction drum trays are provided with holes 27 which are connected to a vacuum source. The trays hold the fabric strip in place while the drum is rotating and release it when it is positioned over the holes in the plastic film. This is accomplished by intermittently cycling the vacuum to release the strip at the proper time. Also shown is the continuous laser system, which produces the holes, and the multiple belt conveyor which maintains the fabric strips in their proper positions while feeding the materials to the sealing drums. A laser has been found to be the most satisfactory perforating means because of its precision. It has been found that the hole size in the irrigation conduits can be very critical and it is necessary to make clean, sharp holes. The laser does this very well. The optimum hole diameter appears to be 0.020 inch, although this can vary depending upon the flow rates desired. It should also be mentioned that the laser can be optionally located prior to the positioning means, but it is not desirable to locate it after the positioning means since the fabric strip might be damaged.

Figure 3:
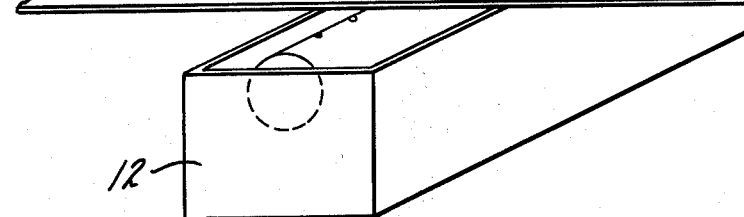
FIG. 3 is a segmented frontal view of a pair of sealing drums, viewed along the machine direction, illustrating how the fabric strips and the two layers of film are fused together to form seals.
Figure 3:
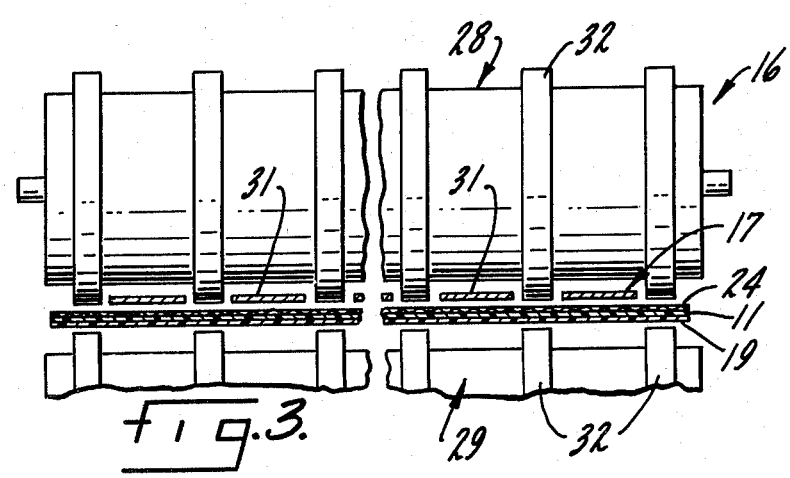

FIG. 3 is a partial frontal view of a pair of sealing drums, illustrating their operation in sealing the three components together. Shown is the top sealing drum 28, the bottom sealing drum 29, the belts 31 of the multiple belt conveyor, the polypropylene fabric strip 24, the first sheet of plastic film 11, and the second sheet of plastic film 19. In the preferred embodiment, the first sheet of plastic film is a co-extruded laminate of polypropylene and poly(ethylene-vinyl acetate), the polypropylene layer being 0.002 inch thick and the poly(ethylene-vinyl acetate) layer being 0.004 inch thick. This composition provides good bonding between the first sheet of film and the fabric, and also between the first sheet of film and the second sheet of film, which is poly(ethylene-vinyl acetate). It should be noted that the three components are not limited to the compositions of the preferred embodiment. The only limitation, when the sealing means is heated sealing drums as opposed to the hot melt adhesives, is that each of the three components be heat sealable to the adjacent component. (Thus, if the fabric strip and the second sheet of plastic film consist of incompatible thermoplastics, then the first sheet of film must be coextruded to be compatible with both of the other components. On the other hand, if the fabric and the second sheet of plastic film are of the same material, then the first sheet of plastic film need not be coextruded.) Each of the sealing drums shown has a plurality of annular protrusions 32 which contact the three components and form a plurality of continuous heat seals in the machine direction. In the preferred embodiment, each sealing drum has 11 annular protrusions measuring ¼ inch wide, thus allowing the simultaneous formation of ten contiguous conduits, each separated from the next by a common seal ¼ inch in width. The distance between the annular protrusions is ¾ inch, and each annular protrusion extends ¾ inch beyond the surface of the drum.

Figure 4:
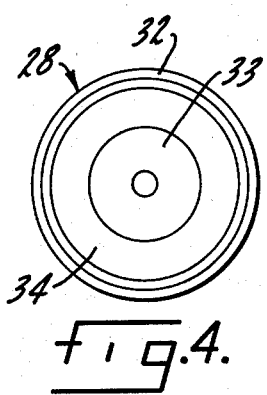
FIG. 4 is an end view of one of the drums of FIG. 3.

FIG. 4 is an end view of the top sealing drum showing its construction, which is the same for all of the sealing drums. The drum itself is aluminum 33 with a cartridge heater 34, although other types of heat sources could also be used. The annular protrusions 32 have an aluminum base and a silicone rubber coating. Three pairs of these drums provide very good heat seals. It should be noted that the silicone rubber coating may not be adequate for other polymers which have higher melting points. In such cases, a material which can withstand higher temperatures must be used.

FIG. 5 is a partial plan view of the web after passing through the sealing drums. Shown is the fabric strip 24 covering a row of holes 36 and the eleven continuous heat seals 37 running in the machine direction. The dashed lines 38 to the right of the figure indicate the line along which the seals are slit to separate the 10 contiguous conduits 39.

FIG. 6 is an enlarged partial cross-sectional view taken along line 6—6 of FIG. 5. Shown is one of the ten contiguous conduits 39 and the common seals 37 which separate each conduit from the next.

FIG. 7 is a segmented plan view of a single conduit after being separated from the web. Since the fabric strip is cut when the seals are slit, each individual conduit is left with a fabric patch over each hole, as shown in the figure.

FIG. 8 is a cross-sectional view taken along line 8—8 of FIG. 7, further showing the structure of the final product. FIG. 9 is a cross-sectional view illustrating the operation of the conduit when filled with water. The water inside the conduit is under pressure and is forced through a hole 36 in the wall of the conduit. The water, under reduced pressure, strikes the fabric patch 24 and is diffused evenly to the surroundings.

It will be obvious to those skilled in the art that many variations from the preferred embodiment, which is shown for purposes of illustration, may be made without departing from the scope of this invention.

I claim:

1. A continuous method of making irrigation conduits comprising:
   a. perforating a first sheet of plastic film with a perforating means repetitively forming rows of holes in the cross-machine direction;
   b. positioning a fabric strip over the holes with a positioning means;
   c. positioning a second sheet of plastic film under said first sheet;
   d. sealing the fabric and the sheets of plastic film together with a sealing means forming a plurality of continuous seals spaced apart a predetermined distance and running in the machine direction, thus forming a plurality of contiguous conduits; and
   e. separating the individual conduits by slitting the seals.

2. The method of claim 1 wherein the perforating means is a laser.

3. The method of claim 1 wherein the positioning means comprises a suction drum adapted to receive and hold fabric strips at desired intervals around its circumference.

4. The method of claim 1 wherein the sealing means comprises a pair of heated sealing drums having a plurality of annular protrusions which contact the plastic components to effect a heat seal.

5. A continuous method of making irrigation conduit having superimposed first and second plastic strips sealed along their edges, said first plastic strip having holes spaced along its length and a fabric patch over said holes, said method comprising:
   a. perforating a first sheet of plastic film with a laser, repetitively forming rows of holes in the cross-machine direction at spaced intervals;
   b. positioning a fabric strip over a row of holes with a suction drum;
   c. positioning a second sheet of plastic film under said first sheet;
   d. sealing the fabric and the sheets of plastic film together with heated sealing drums having annular protrusions which form a plurality of continuous fused seals running in the machine direction; and
   e. slitting the seals lengthwise to separate the resulting conduits.

* * * * *